(12) United States Patent
Narendran et al.

(10) Patent No.: US 10,412,644 B1
(45) Date of Patent: Sep. 10, 2019

(54) REDIRECTION OF USER EQUIPMENT FROM A SOURCE FREQUENCY BAND TO A TARGET FREQUENCY BAND IN A REPEATER CHAIN

(71) Applicant: Sprint Communications Company L.P., Overland Park, KS (US)

(72) Inventors: Rajveen Narendran, Olathe, KS (US); Bryan Timothy Barbee, Olathe, KS (US); Andrew Mark Wurtenberger, Olathe, KS (US); Sreekar Marupaduga, Overland Park, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 89 days.

(21) Appl. No.: 15/336,425

(22) Filed: Oct. 27, 2016

(51) Int. Cl.
*H04W 36/08* (2009.01)
*H04W 36/36* (2009.01)
*H04W 36/24* (2009.01)
*H04W 28/18* (2009.01)
*H04L 5/00* (2006.01)

(52) U.S. Cl.
CPC ........... *H04W 36/08* (2013.01); *H04L 5/0048* (2013.01); *H04W 28/18* (2013.01); *H04W 36/24* (2013.01); *H04W 36/36* (2013.01); *H04L 5/0007* (2013.01)

(58) Field of Classification Search
CPC ...... H04W 36/08; H04W 28/18; H04L 5/0048
See application file for complete search history.

(56) References Cited

U.S. PATENT DOCUMENTS

| 6,289,097 | B1 | 9/2001 | Gregory et al. | |
|---|---|---|---|---|
| 8,780,755 | B1 | 7/2014 | Gopi et al. | |
| 8,781,408 | B2 | 7/2014 | Steer | |
| 2004/0160928 | A1* | 8/2004 | Perlman | H04L 63/0428 370/338 |
| 2006/0205342 | A1 | 9/2006 | McKay et al. | |
| 2009/0098871 | A1 | 4/2009 | Gogic | |
| 2009/0204265 | A1 | 8/2009 | Hackett | |
| 2010/0284446 | A1* | 11/2010 | Mu | H04B 7/15521 375/211 |
| 2013/0286965 | A1* | 10/2013 | Xu | H04W 16/26 370/329 |
| 2016/0365966 | A1* | 12/2016 | Bennett | H04L 5/1461 |

* cited by examiner

*Primary Examiner* — Jeffrey M Rutkowski
*Assistant Examiner* — Chae S Lee

(57) ABSTRACT

A wireless communication network redirects User Equipment (UE) from a source frequency band to a target frequency band. An originating wireless repeater in a wireless repeater chain wirelessly receives wireless source signals including source overhead over the source frequency band and wirelessly receives wireless target signals including target overhead over the target frequency band. The originating wireless repeater wirelessly transmits the wireless source signals including the source overhead over the source frequency band and wirelessly transmits the wireless target signals including the target overhead over the target frequency band. A terminating wireless repeater in the wireless repeater chain wirelessly receives the wireless target signals including the target overhead over the target frequency band and wirelessly transmits the wireless target signals including the target overhead over the target frequency band. The terminating wireless repeater wirelessly transmits modified source overhead over the source frequency band indicating redirection to the target frequency band.

12 Claims, 5 Drawing Sheets

REDIRECTION OF USER EQUIPMENT FROM A SOURCE FREQUENCY BAND TO A TARGET FREQUENCY BAND IN A REPEATER CHAIN

TECHNICAL BACKGROUND

Wireless communication systems transfer data packets between User Equipment (UE) to provide data communication services, like internet access, voice calls, media streaming, user messaging, among other communication services. Wireless communication systems allow users to move about and communicate over the air with access communication.

To expand or enhance the wireless signal coverage of a wireless communication network, repeaters may be added to locations not adequately covered by current network infrastructure. A repeater transmits and receives wireless signals exchanged between UEs and a wireless access point. Without the signal repetition provided by the wireless repeater, the coverage area of the wireless network access point may otherwise have not extended far enough to serve the UEs using the repeater. Thus, a wireless repeater provides a less resource intensive means for increasing wireless network coverage.

Although repeaters are a useful solution to expanding network coverage, not all repeaters in a repeater chain may be capable of supporting all of the frequency bands and frequency channels that are used by the wireless network access point and other repeaters in the repeater chain. Unfortunately, current methods of redirecting UEs to supported frequencies for a repeater in the wireless repeater chain are neither efficient nor effective.

TECHNICAL OVERVIEW

A wireless communication network redirects User Equipment (UE) from a source frequency band to a target frequency band. An originating wireless repeater in a wireless repeater chain wirelessly receives source signals including source network overhead over the source frequency band and wirelessly receives target signals including target network overhead over the target frequency band. The originating wireless repeater wirelessly transmits the source signals including the source overhead over the source frequency band and wirelessly transmits the target signals including the target overhead over the target frequency band. A terminating wireless repeater in the wireless repeater chain wirelessly receives the target signals including the target overhead over the target frequency band and wirelessly transmits the target signals including the target overhead over the target frequency band. The terminating wireless repeater wirelessly transmits modified source overhead over the source frequency band that indicates redirection to the target frequency band.

DETAILED DESCRIPTION

Figure 1:
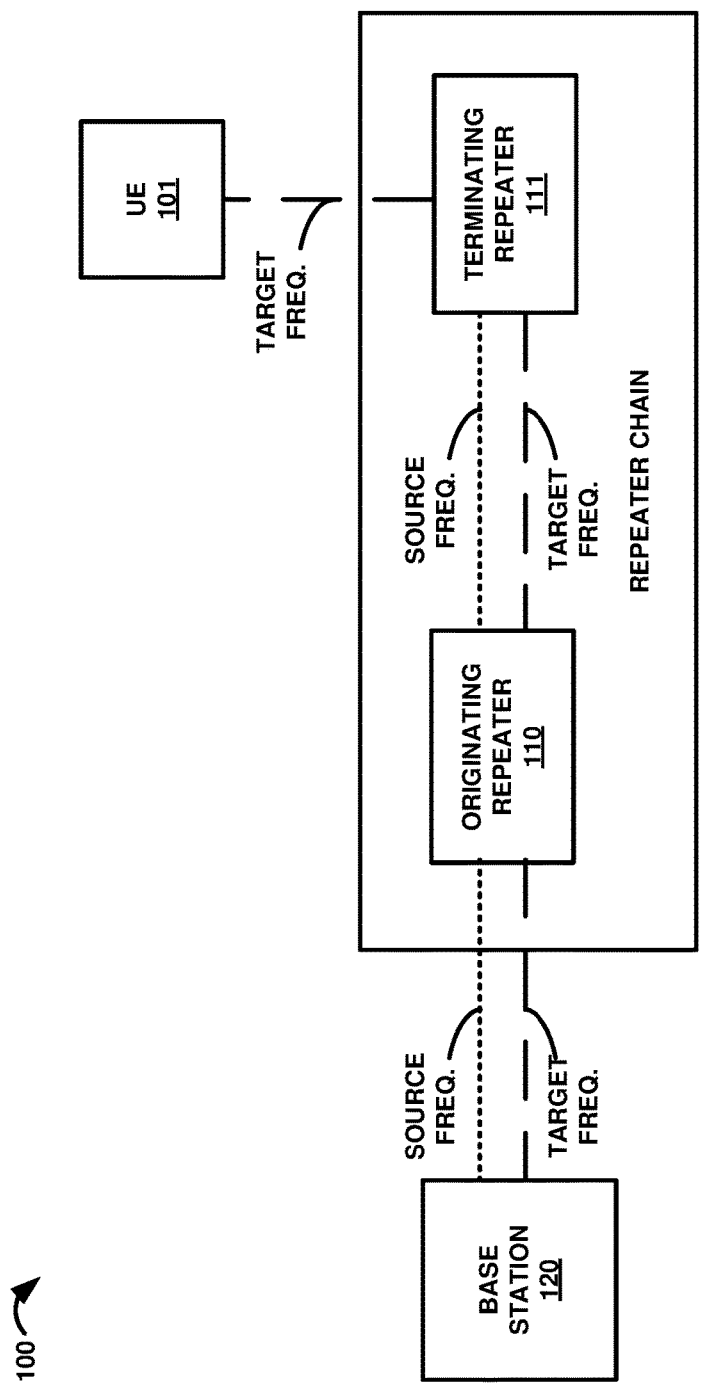
FIGS. 1-3 illustrate a wireless communication system to redirect User Equipment (UE) from a source frequency band to a target frequency band in a wireless repeater chain.
Figure 2:
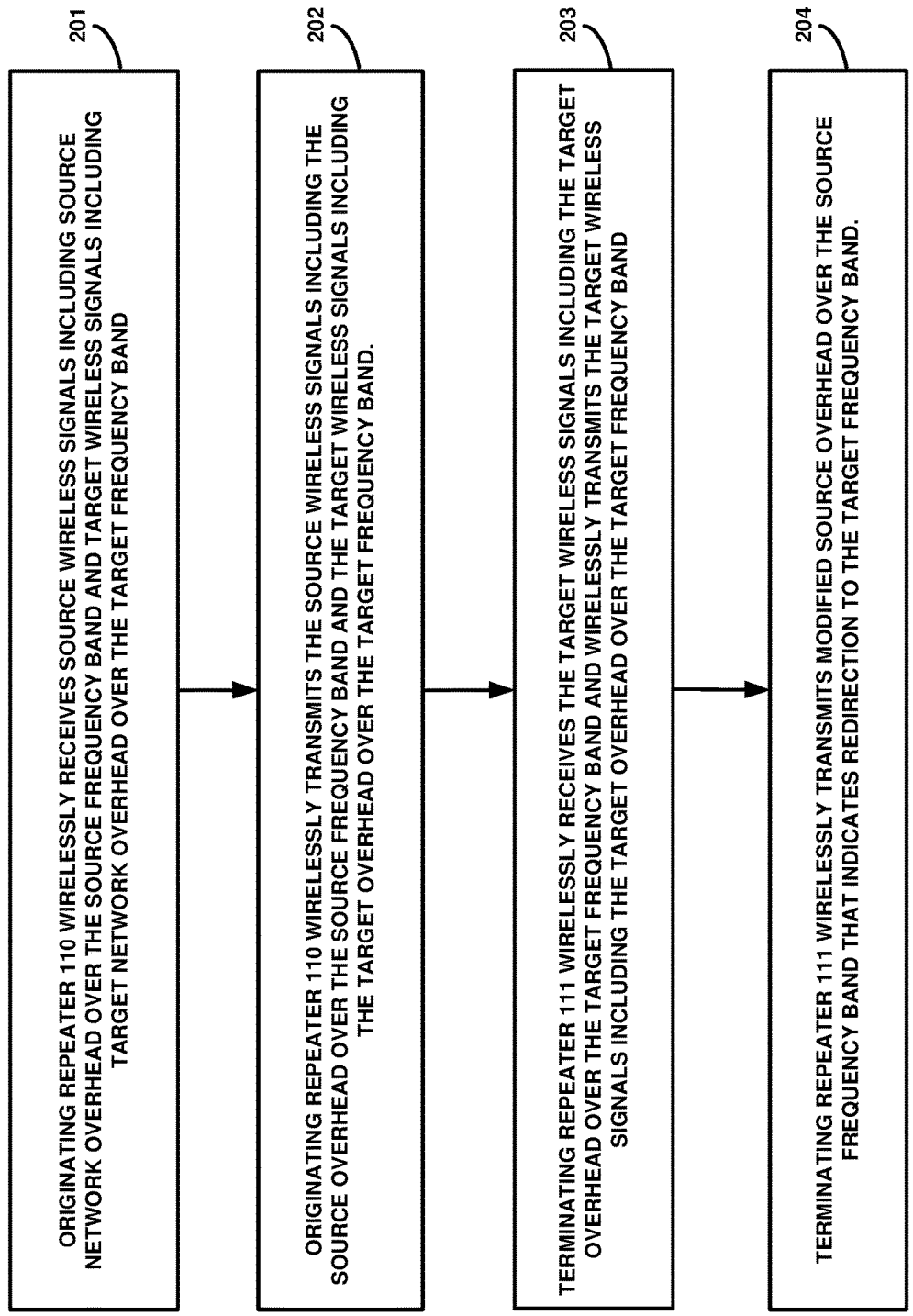
Figure 3:
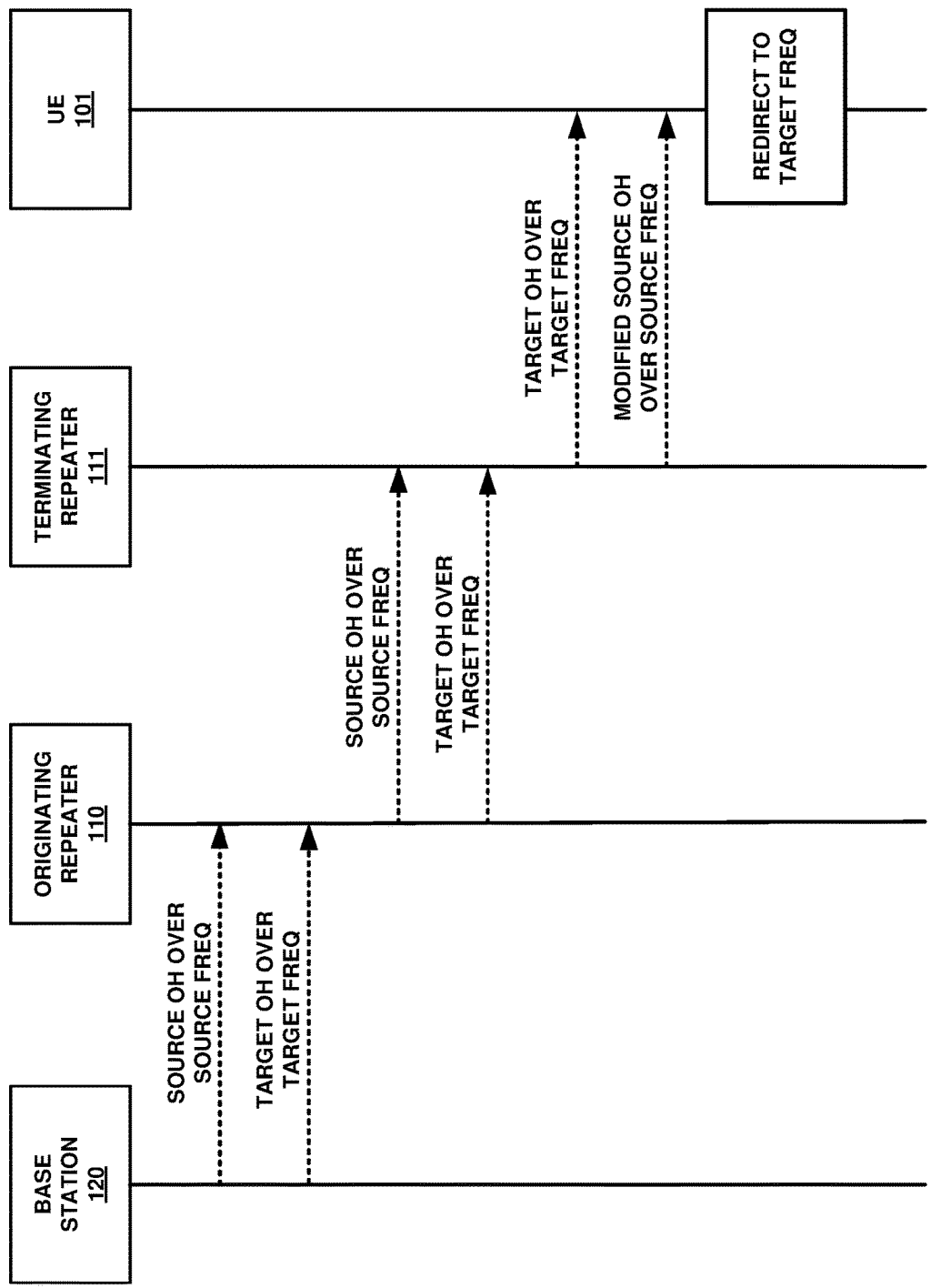

FIGS. 1-3 illustrate wireless communication system 100 to redirect User Equipment (UE) from a source frequency band to a target frequency band in a wireless repeater chain. Referring to FIG. 1, communication system 100 comprises UE 101, originating wireless repeater 110 in the repeater chain, terminating wireless repeater 111 in the repeater chain, and base station 120. UE 101 communicates with base station 120 over wireless repeaters 110-111 in the wireless repeater chain over wireless links supporting a source frequency and a target frequency. Base station 120 may have backhaul connectivity to one or more core networks over various wired and/or wireless data connections.

UE 101 could be a phone, tablet computer, media device, an intelligent machine, or some other apparatus having a wireless transceiver. UE 101 includes processing circuitry and memory that store and execute various software modules. In particular, UE 101 may receive overhead data over various frequency bands and frequency channels.

Wireless repeaters 110-111 may comprise a mini-macro cell, a femtocell, a picocell, or some other wireless base station capable of providing wireless communication services to UE 101. Wireless repeaters 110-111 in repeater the chain typically include amplifiers, filters, RF modulators, and signal processing circuitry. In particular, wireless repeaters 110-111 may be configured to provide wireless coverage to one or more UEs for voice calls, media streaming, internet access, text messages, and the like. Wireless repeaters 110-111 are capable of receiving and transmitting signal overhead data over various frequency bands and frequency channels between base station 120 and UE 101.

Base station 120 may comprise a macro base station, a wireless hotspot, an evolved NodeB (eNodeB), or some other base station that may provide wireless communication services to UE 101 over wireless repeaters 110-111. Base station 120 includes include Radio Frequency (RF) communication circuitry, communication interfaces, network interfaces, processing systems, microprocessors, storage systems, storage media, or some other processing devices or software systems, and may be distributed among multiple devices.

In operation, originating wireless repeater 110 in the wireless repeater chain wirelessly receives source wireless signals including source overhead over the source frequency band and wirelessly receives target wireless signals including target overhead over the target frequency band. The source frequency band and the target frequency band include a frequency range which may be divided into multiple sub-ranges to form frequency channels within each frequency band. For example, a frequency band of 2.5 GHz is divided into twenty frequency channels.

Source wireless signals and target wireless signals use the air or space as the transport media. Source wireless signals and target wireless signals may use various protocols, such as Long Term Evolution (LTE), Code Division Multiple Access (CDMA), Orthogonal Frequency Division Multiplexing Access (OFDMA), LTE Wireless Aggregation (LWA), Internet Protocol (IP), Evolution Data Only (EVDO), Worldwide Interoperability for Microwave Access (WIMAX), Global System for Mobile Communication (GSM), LTE, Wireless Fidelity (WIFI), High Speed Packet Access (HSPA), or some other wireless communication format—including combinations thereof.

Source overhead and target overhead may comprise pilot signal data which includes codes or other data streams transmitted by base station 120 to wireless access data over wireless repeaters 110-111. Source overhead and target overhead may include a mobile country code, mobile network code, channel bandwidth, channel scheduling sequences, and other access data used by devices to communicate with base station 120 over wireless repeaters 110-111.

Originating wireless repeater 110 wirelessly transmits the source wireless signals including the source overhead over the source frequency band and wirelessly transmits the target wireless signals including the target overhead over the target frequency band. Terminating wireless repeater 111 in the wireless repeater chain wirelessly then receives the target wireless signals including the target overhead over the target frequency band and wirelessly transmits the target wireless signals including the target overhead over the target frequency band.

Terminating wireless repeater 111 wirelessly transmits modified source overhead over the source frequency band that indicates redirection to the target frequency band. Terminating wireless repeater 111 may re-broadcast the modified source overhead in a code, such as a Pseudorandom Number (PN) code, CDMA spreading code, or some other type of data stream transmitted by first repeater 111 in repeater chain 110 to identify the repeater and repeater access data.

Modified source overhead may be transmitted in a Global Service Redirection (GSR) message in the pilot signal indicating redirection to the target frequency band. The modified source overhead data may also be transmitted in a page or sync message over the source frequency band indicating that the source frequency band is not supported by terminating wireless repeater 111. The modified source overhead in the redirection message may also indicate a number of channels and the target channel in addition to the target frequency band. It should be noted that the modified source overhead may be determined dynamically or statically based on local configurations.

FIG. 2 is a flow diagram illustrating an operation of wireless communication system 100 to redirect UE from a source frequency band to a target frequency band in a wireless repeater chain. In a first operation, originating wireless repeater 110 in the wireless repeater chain wirelessly receives (201) source wireless signals including source overhead over the source frequency band and wirelessly receives (201) target wireless signals including target overhead over the target frequency band. Originating wireless repeater 110 wirelessly transmits (202) the source wireless signals including the source overhead over the source frequency band and wirelessly transmits (202) the target wireless signals including the target overhead over the target frequency band.

Terminating wireless repeater 111 in the wireless repeater chain wirelessly receives (203) the target wireless signals including the target overhead over the target frequency band and wirelessly transmits (203) the target wireless signals including the target overhead over the target frequency band. Terminating wireless repeater 111 wirelessly transmits (204) modified source overhead over the source frequency band that indicates redirection to the target frequency band.

FIG. 3 is a sequence diagram illustrating the operation of wireless communication system 100 to redirect UE from a source frequency band to a target frequency band in a wireless repeater chain. In a first operation, originating wireless repeater 110 in the wireless repeater chain wirelessly receives source wireless signals including source overhead over the source frequency band and wirelessly receives target wireless signals including target overhead over the target frequency band.

Originating wireless repeater 110 wirelessly transmits the source wireless signals including the source overhead over the source frequency band and wirelessly transmits the target wireless signals including the target overhead over the target frequency band. Terminating wireless repeater 111 in the wireless repeater chain wirelessly receives the target wireless signals including the target overhead over the target frequency band and wirelessly transmits the target wireless signals including the target overhead over the target frequency band.

In some examples, terminating wireless repeater 111 wirelessly transmits the modified source overhead to indicate redirection to a target frequency channel in the target frequency band. In other examples, terminating wireless repeater 111 wirelessly transmits the modified source overhead to indicate a number of target frequency channels in the target frequency band. In other examples, a power amplifier in terminating wireless repeater 111 generates the modified source overhead.

In some examples, terminating wireless repeater 111 wirelessly receives the source overhead over the source frequency band and transmits at least a portion of the received source overhead in the modified source overhead. In other examples, terminating wireless repeater 111 wirelessly transmits the modified source overhead in an OFDM Primary Synchronization Signal (PSS).

In some examples, terminating wireless repeater 111 wirelessly receives an instruction indicating the modified source overhead and transmits the modified source overhead in response to the instruction. In other examples, base station 120 transmits the instruction indicating the modified source overhead to terminating wireless repeater 111. Terminating wireless repeater 111 then transmits the modified source overhead in response to the received instruction.

Terminating wireless repeater 111 wirelessly transmits modified source overhead over the source frequency band that indicates redirection to the target frequency band. In some examples, UE 101 receives the modified source overhead over the source frequency band from terminating wireless repeater 111 that indicates redirection to the target frequency band, and in response, UE 101 wirelessly receives the target wireless signals including the target overhead over the target frequency band.

Figure 4:
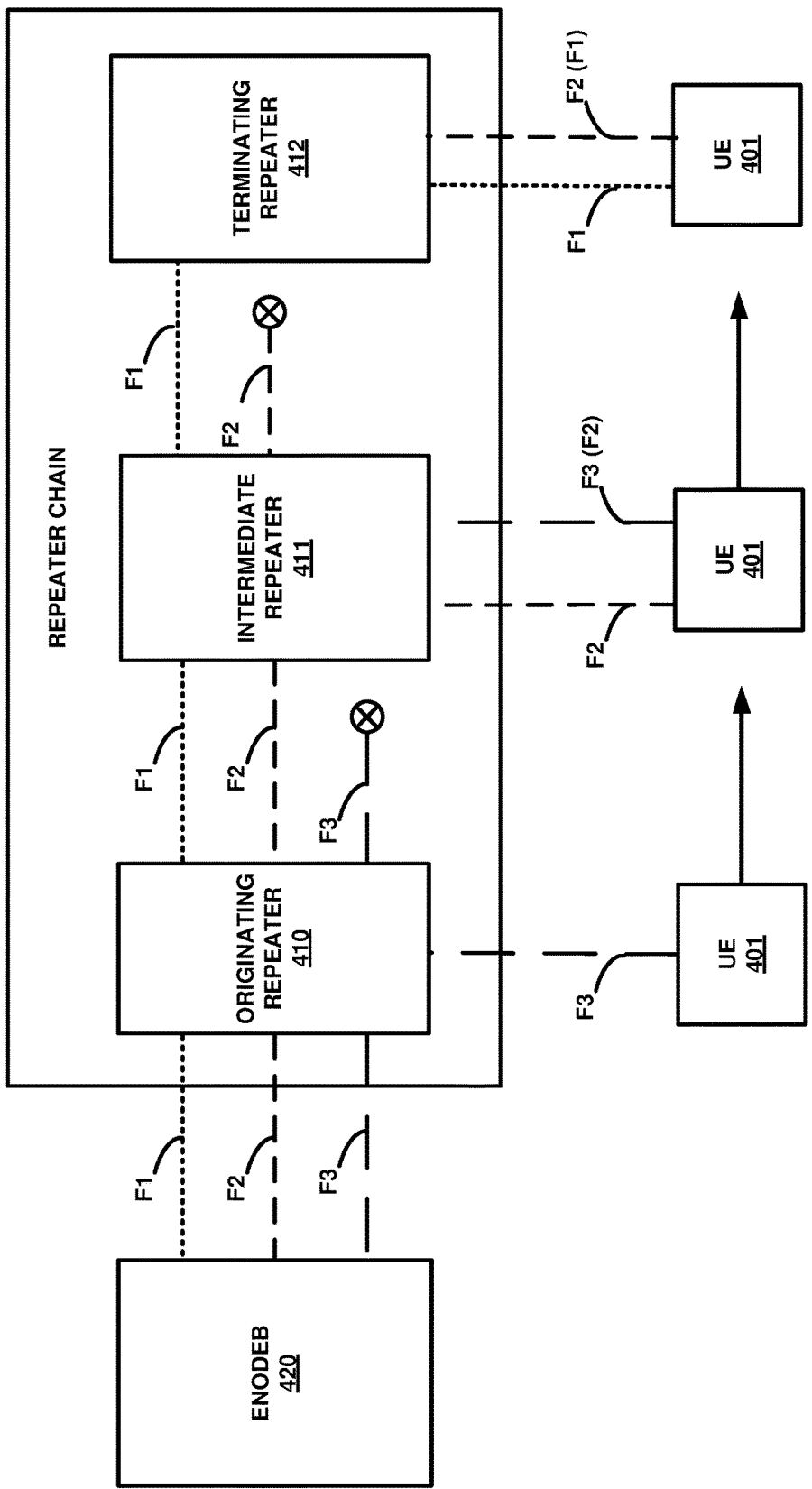
FIG. 4 illustrates a Long Term Evolution (LTE) communication system to redirect a UE from a source frequency band to a target frequency band in a wireless repeater chain.

FIG. 4 illustrates Long Term Evolution (LTE) communication system 400 to redirect UE from a source frequency band to a target frequency band in a wireless repeater chain. LTE communication system 400 is an example of wireless communication system 100, although wireless communication system 100 may use alternative configurations and operations. LTE communication system 400 includes UEs 401, originating wireless repeater 410, intermediate wireless repeater 411, terminating wireless repeater 412, and eNodeB 420.

UE 401 exchanges data and signaling with wireless repeaters 410-412 and eNodeB 420 over RF links. Wireless repeaters 410-412 and eNodeB 420 exchange data and signaling over a Simple Network Management Protocol (SNMP) interface communication link. Base station 420 and originating wireless repeater 410 exchange data and signaling over a first frequency band, second frequency band, and third frequency band. Originating wireless repeater 410 and intermediate wireless repeater 411 exchange data and signaling over the first frequency band, second frequency band, and third. Intermediate wireless repeater 411 and terminating wireless repeater 412 exchange data and signaling over the first frequency band and second frequency band. As shown by the arrow, UE 401 is moving from originating wireless repeater 410 toward intermediate wireless repeater 411 and terminating wireless repeater 412.

In a first operation, originating wireless repeater 410 wirelessly receives a Primary Synchronization Signal (PSS) including the first overhead data over the first frequency band, a Secondary Synchronization Signal (SSS) including the second overhead data over the second frequency band, and a Tertiary Synchronization Signal (TSS) including third overhead data over the third frequency band from eNodeB 420. Originating wireless repeater 410 only transmits the PSS including the first overhead data over the first frequency band, the SSS including the second overhead data over the second frequency band, and the TSS including the third overhead data over the third frequency band. It should be noted that at this point UE 401 is exchanging data and signaling with originating wireless repeater 410 over the third frequency band but is moving toward intermediate wireless repeater 411 which does not support the third frequency band.

Intermediate wireless repeater 411 in the wireless repeater chain wirelessly receives the PSS over the first frequency band, the SSS over the second frequency band, and TSS over the third frequency band. Intermediate wireless repeater 411 wirelessly transmits the PSS over the first frequency band and the SSS over the second frequency band. However, intermediate wireless repeater 411 transfers modified source overhead data in the TSS indicating redirection from the third frequency band to the second frequency band. UE 401 is currently exchanging data and signaling with intermediate wireless repeater 411 over the second frequency band but is moving toward terminating wireless repeater 412 which does not support the second frequency band.

Terminating wireless repeater 412 in the wireless repeater chain wirelessly receives the PSS including the first overhead over the first frequency band and the SSS including second overhead over the second frequency band. Terminating wireless repeater 412 wirelessly transmits the PSS including the first overhead over the first frequency band. However, terminating wireless repeater 412 transfers modified source overhead data in the SSS indicating redirection from the second frequency band to the first frequency band. UE 401 then exchanges data and signaling with terminating wireless repeater 412 over the first frequency band only.

Figure 5:
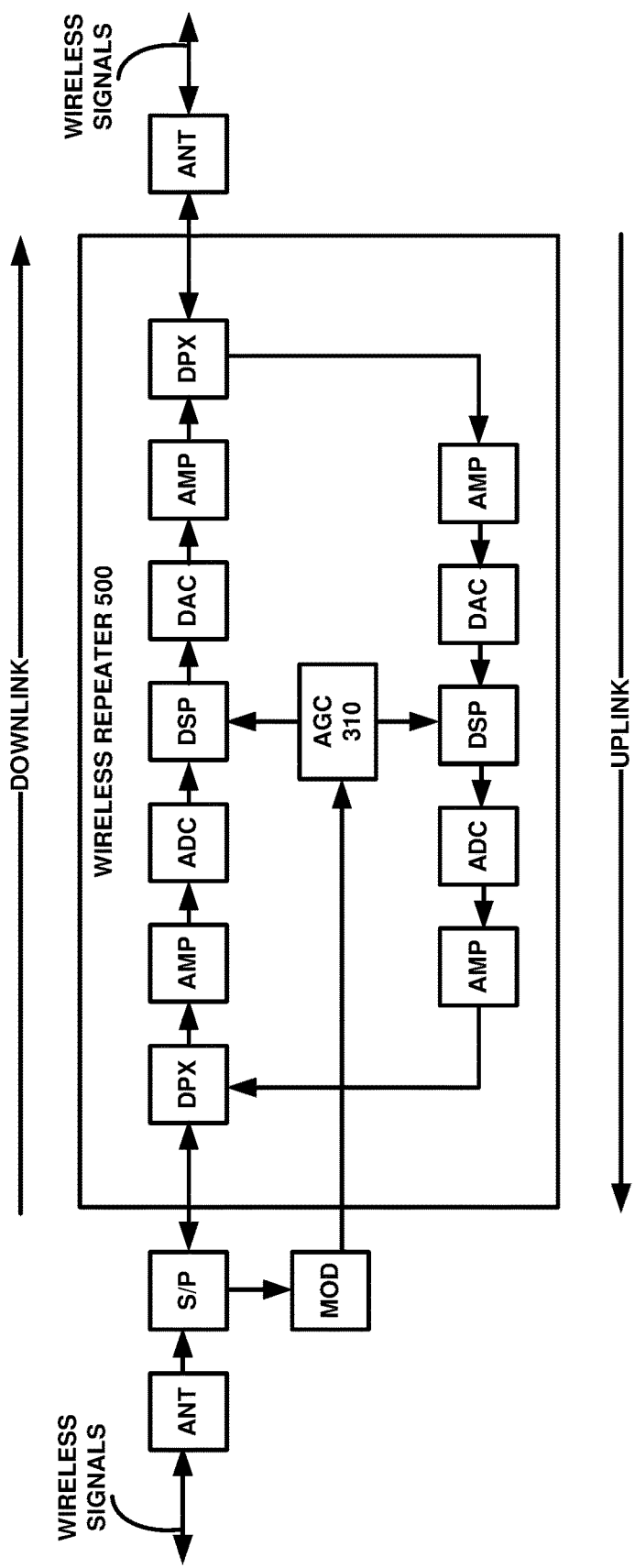
FIG. 5 illustrates a wireless repeater that redirects a UE from a source frequency band to a target frequency band in a wireless repeater chain.

FIG. 5 illustrates wireless repeater 500 to redirect a UE from a source frequency band to a target frequency band in a wireless repeater chain. Wireless repeater 500 is an example of wireless repeaters 110-111 and wireless repeaters 410-412, although wireless repeaters 110-111 and wireless repeaters 410-412 may use alternative configurations and operations. Wireless repeater 500 includes source wireless signals, target wireless signals, antenna systems, Automatic Gain Control (AGC) systems, a splitter (S/P), and a modem (MOD). Wireless repeater 500 also includes duplexers (DPX), amplifiers (AMP), analog-to-digital converters (ADC), digital signaling processing systems (DSP), and digital-to-analog converters (DAC).

In operation, a source wireless signals including source overhead data transmitted over the source frequency band and target wireless source signals including target overhead data transmitted over a target frequency band are wirelessly received at the antenna system. The source wireless signals and the target wireless signals are then delivered to the splitter, which splits the source wireless signals and target wireless signals and transfers the split wireless signals to a modem and a duplexer. The duplexer transfers the source wireless signals and the target wireless signals to the amplifier.

In this point in the process, processing on the source wireless signals may terminate but the target wireless signals are transferred to an analog-to-digital converter by the amplifier and the converter transfers the converted target wireless signals to a data signal processor. After processing, the target wireless signals are transferred to a digital-to-analog convertor, which converts the target wireless signals and transfers the converted target wireless signals to an amplifier.

The amplifier then transfers the target wireless signals to a duplexer that transfers target wireless signals to another antenna system. The amplifier may also transfer source wireless signals indicating redirection from the source frequency band to the target frequency band to the antenna system. Downlink wireless signals go from left to right and uplink wireless signals go from right to left. The modem transfers the wireless signals to the other AGC, which processes the wireless signals and determines whether to apply AGC. The other AGC then transfers AGC instructions to the wireless signal processors, as needed. In some examples, the same AGC instruction is sent to the wireless signal processors in both the downlink and uplink.

The above descriptions and associated figures depict specific embodiments to teach those skilled in the art how to make and use the best mode of the invention. The following claims specify the scope of the invention. Note that some aspects of the best mode may not fall within the scope of the invention as specified by the claims. Those skilled in the art will appreciate variations from these embodiments that fall within the scope of the invention and that the features described above can be combined in various ways to form multiple embodiments. As a result, the invention is not limited to the specific embodiments described above, but only by the claims and their equivalents.

What is claimed is:

1. A method of operating wireless communication network to redirect User Equipment (UE) from a source frequency band to a target frequency band in a wireless repeater chain, the method comprising:
   a wireless base station wirelessly transmitting an instruction comprising modified source overhead that indicates UE redirection to the target frequency band;
   a terminating wireless repeater in the wireless repeater chain wirelessly receiving the instruction comprising the modified source overhead that indicates the UE redirection to the target frequency band;
   the terminating wireless repeater wirelessly receiving target wireless signals including target overhead over the target frequency band and wirelessly transmitting the target wireless signals including the target overhead over the target frequency band;
   in response to the instruction, the terminating wireless repeater generating the modified source overhead that indicates UE redirection to the target frequency band and wirelessly transmitting the modified source overhead over the source frequency band; and
   the UE wirelessly receiving the modified source overhead over the source frequency band from the terminating wireless repeater, and in response, the UE redirecting from the source frequency band to the target frequency band and wirelessly receiving the target wireless signals including the target overhead over the target frequency band.

2. The method of claim 1 wherein the terminating wireless repeater generating and wirelessly transmitting the modified source overhead comprises the terminating wireless repeater generating and wirelessly transmitting the modified source overhead that indicates redirection to a target frequency channel in the target frequency band.

3. The method of claim 1 wherein the terminating wireless repeater generating and wirelessly transmitting the modified source overhead comprises the terminating wireless repeater generating and wirelessly transmitting the modified source overhead that indicates a number of target frequency channels in the target frequency band.

4. The method of claim 1 wherein the terminating wireless repeater generating the modified source overhead comprises a power amplifier in the terminating wireless repeater generating the modified source overhead.

5. The method of claim 1 further comprising the terminating wireless repeater in the wireless repeater chain wirelessly receiving the source overhead over the source frequency band and wherein wirelessly transmitting the modified source overhead comprises wirelessly transmitting at least a portion of the received source overhead in the modified source overhead.

6. The method of claim 1 wherein the terminating wireless repeater wirelessly transmitting the modified source overhead comprises the terminating wireless repeater wirelessly transmitting the modified source overhead in an Orthogonal Frequency Division Multiplexing (OFDM) Primary Synchronization Signal (PSS).

7. A wireless communication network to redirect User Equipment (UE) from a source frequency band to a target frequency band in a wireless repeater chain, the wireless communication network comprising:
  a wireless base station configured to wirelessly transmit an instruction comprising modified source overhead that indicates UE redirection to the target frequency band;
  in the wireless repeater chain, a terminating wireless repeater configured to wirelessly receive the instruction comprising the modified source overhead that indicates the UE redirection to the target frequency band;
  in the wireless repeater chain, the a terminating wireless repeater configured to wirelessly receive target wireless signals including target overhead over the target frequency band and wirelessly transmit the target wireless signals including the target overhead over the target frequency band;
  in the wireless repeater chain and in response to the instruction, the terminating wireless repeater configured to generate the modified source overhead that indicates the UE redirection to the target frequency band and wirelessly transmit the modified source overhead over the source frequency band; and
  the UE configured to wirelessly receive the modified source overhead over the source frequency band from the terminating wireless repeater, and in response, redirect from the source frequency band to the target frequency band and wirelessly receive the target wireless signals including the target overhead over the target frequency band.

8. The wireless communication network of claim 7 wherein the terminating wireless repeater is configured to generate and wirelessly transmit the modified source overhead that indicates redirection to a target frequency channel in the target frequency band.

9. The wireless communication network of claim 7 wherein the terminating wireless repeater is configured to generate and wirelessly transmit the modified source overhead that indicates a number of target frequency channels in the target frequency band.

10. The wireless communication network of claim 7 wherein the terminating wireless repeater comprises a power amplifier configured to generate the modified source overhead.

11. The wireless communication network of claim 7 further comprising the terminating wireless repeater in the wireless repeater chain configured to wirelessly receive the source overhead over the source frequency band and to wirelessly transmit at least a portion of the received source overhead in the modified source overhead.

12. The wireless communication network of claim 7 wherein the terminating wireless repeater is configured to wirelessly transmit the modified source overhead in an Orthogonal Frequency Division Multiplexing (OFDM) Primary Synchronization Signal (PSS).

* * * * *